(12) United States Patent
Furuyama et al.

(10) Patent No.: US 8,500,888 B2
(45) Date of Patent: Aug. 6, 2013

(54) REGENERATION TOWER AND DRY APPARATUS FOR EXHAUST-GAS TREATMENT

(75) Inventors: Kuninori Furuyama, Tokyo (JP); Masahiro Miya, Tokyo (JP); Ryo Suzuki, Tokyo (JP)

(73) Assignee: J-Power EnTech, Inc., Tokyo (JP)

( * ) Notice: Subject to any disclaimer, the term of this patent is extended or adjusted under 35 U.S.C. 154(b) by 53 days.

(21) Appl. No.: 13/202,978

(22) PCT Filed: Mar. 16, 2009

(86) PCT No.: PCT/JP2009/055074
§ 371 (c)(1), (2), (4) Date: Aug. 23, 2011

(87) PCT Pub. No.: WO2010/106623
PCT Pub. Date: Sep. 23, 2010

(65) Prior Publication Data
US 2011/0315017 A1    Dec. 29, 2011

(51) Int. Cl.
*B01D 53/02* (2006.01)
(52) U.S. Cl.
USPC .......... 96/150; 96/136; 96/143; 96/146; 95/107; 95/111; 95/275; 95/276
(58) Field of Classification Search
USPC .......... 96/136, 143, 146, 150; 95/107, 111, 95/275, 276
See application file for complete search history.

(56) References Cited

U.S. PATENT DOCUMENTS

| | | | | |
|---|---|---|---|---|
| 3,864,102 A * | 2/1975 | Powers | | 95/39 |
| 3,960,529 A * | 6/1976 | Juntgen et al. | | 96/150 |
| 4,017,278 A * | 4/1977 | Reese | | 95/268 |
| 4,047,906 A * | 9/1977 | Murakami et al. | | 95/109 |
| 4,292,054 A * | 9/1981 | Noack et al. | | 96/112 |
| 4,306,886 A * | 12/1981 | Clyde | | 95/111 |
| 4,744,804 A * | 5/1988 | Furuyama et al. | | 95/111 |
| 5,256,174 A * | 10/1993 | Kai et al. | | 96/116 |
| 5,344,616 A * | 9/1994 | Bruggendick | | 422/171 |
| 7,014,682 B2 * | 3/2006 | Hickerson et al. | | 95/92 |
| 7,258,725 B2 * | 8/2007 | Ohmi et al. | | 95/41 |
| 7,285,250 B2 * | 10/2007 | Kanno et al. | | 422/171 |
| 7,918,926 B2 * | 4/2011 | Iijima et al. | | 96/234 |
| 8,231,719 B2 * | 7/2012 | Yoshiyama et al. | | 96/234 |

(Continued)

FOREIGN PATENT DOCUMENTS

JP  55-126522 A  9/1980
JP  55126522 A   9/1980

(Continued)

OTHER PUBLICATIONS

International Search Report, PCT/JP2009/055074, dated Jun. 9, 2009.

(Continued)

*Primary Examiner* — Christopher P Jones
(74) *Attorney, Agent, or Firm* — Nixon Peabody LLP (57) ABSTRACT

A regeneration tower including a regeneration tower main body having a long trunk, and desorbed gas discharge passages through which a desorbed gas is discharged. The regeneration tower main body is configured so that a heating unit that heats an adsorbent, a separation part that separates desorbable substances as a desorbed gas from the heated adsorbent, and a cooling unit that cools the adsorbent from which the desorbable substances have been desorbed by heating are communicatively disposed in one direction and the heating unit and the cooling unit have approximately the same sectional outer diameter.

5 Claims, 4 Drawing Sheets

U.S. PATENT DOCUMENTS

| | | | |
|---|---|---|---|
| 2006/0162560 A1* | 7/2006 | Mok et al. | 95/237 |
| 2010/0095845 A1* | 4/2010 | Mok et al. | 95/166 |
| 2011/0088557 A1* | 4/2011 | Yi et al. | 96/144 |
| 2011/0120315 A1* | 5/2011 | Iijima et al. | 96/242 |
| 2011/0315016 A1* | 12/2011 | Furuyama et al. | 96/143 |

FOREIGN PATENT DOCUMENTS

| | | |
|---|---|---|
| JP | 58-137441 | 9/1983 |
| JP | 07-53970 A | 2/1995 |
| JP | 2003-286020 A | 10/2003 |
| JP | 2006-075670 A | 3/2006 |

OTHER PUBLICATIONS

International Search Report, PCT/JP2009/055074, dated Jun. 23, 2009.

* cited by examiner

REGENERATION TOWER AND DRY APPARATUS FOR EXHAUST-GAS TREATMENT

CROSS REFERENCE TO RELATED APPLICATIONS OR PRIORITY CLAIM

This application is a national phase of International Application No. PCT/JP2009/055074, entitled "REGENERATION COLUMN AND DRY APPARATUS FOR DISCHARGE GAS TREATMENT", which was filed on Mar. 16, 2009, the contents of which is incorporated herein by reference.

1. Field of the Invention

The present invention relates to a regeneration tower and a dry exhaust-gas treating apparatus.

2. Background Art

A dry exhaust-gas treating apparatus for removing various harmful substances in a exhaust-gas, such as SOx (sulfur oxide), NOx (nitrogen oxide), and so forth, by bringing the exhaust-gas into contact with an adsorbent introduced into an adsorption tower has been known as an apparatus for treating the exhaust-gas from a boiler, an incinerator, or a sintering furnace.

Examples of the adsorbent include a carbonaceous adsorbent, an alumina adsorbent, a silica adsorbent, and so forth. The carbonaceous adsorbent is excellent, because it can be treated at a relatively low temperature and remove various harmful substances at the same time. Examples of the carbonaceous adsorbent include activated carbon, activated char, activated coke, and so forth. Particularly, a granular adsorbent pelletized to a size of 0.5 cm to 4 cm is preferable. These adsorbents are well known.

In this apparatus, SOx in the exhaust-gas is removed as sulfuric acid by adsorption to the adsorbent. Further, when ammonia is injected into the exhaust-gas for pre-treatment, SOx is adsorbed as ammonium salts, and NOx is harmlessly reduced into nitrogen and water by catalysis of the adsorbent. The other harmful components are mainly adsorbed to the adsorbent and removed.

A large quantity of various substances, such as sulfuric acid, ammonium salts, and so forth, are attached to the adsorbent used for treating the exhaust-gas in the adsorption tower, so that the adsorbent has low activity. For this reason, this adsorbent is transferred to a regeneration tower via a transfer path such as a conveyor, and heated and regenerated in the regeneration tower, and adsorbed substances are released from the adsorbent in the regeneration tower so as to restore the activity of the adsorbent to its original state.

The adsorbent whose activity is restored is transferred back to the adsorption tower via a transfer path such as a conveyor. When the adsorbent is heated and regenerated, a gas (e.g. a carrier gas) for purging the substances released from the adsorbent may be used. For example, an inert gas such as nitrogen is used.

As a heating and regenerating method in the regeneration tower, a counterflow method of causing a desorbed gas, in which the adsorbed substances are released from the adsorbent, to flow in a direction opposite to a flow direction of the adsorbent that flows down in the regeneration tower standing in a tube shape is known. This counterflow method has an advantage in that initially released ammonia is barely present in the desorbed gas because the released ammonia is adsorbed into the adsorbent again (e.g. see Patent Document 1).

As such, when the desorbed gas is sent to byproduct recovery equipment to produce a byproduct such as sulfuric acid or gypsum, it is possible to reduce a load of cleaning equipment, and thus this counterflow method is excellent.

Patent Document 1: Japanese Patent Application Publication No. 2006-75670

DISCLOSURE OF THE INVENTION

Problems to be Solved by the Invention

The conventional regeneration tower and dry exhaust-gas treating apparatus are, however, apt to contain dust such as dust and soot in the desorbed gas and to deposit dust in a desorbed gas discharge passage. As such, the desorbed gas discharge passage may be blocked or corroded by the deposited dust adsorbing SO2 included in the desorbed gas. Further, when a fan is disposed downstream of the desorbed gas discharge passage, the dust is deposited in a casing, thereby lowering performance of the fan. Even when cleaning equipment of the desorbed gas is disposed, the dust is included in drained water after cleaning, and thus a draining treatment becomes difficult.

Further, in the regeneration tower, when a heat exchanging part located on a downstream side of the adsorbent is set to have a sectional outer diameter larger than that of the inner barrel of a separation part, a flow velocity distribution of the adsorbent on the same cross section becomes non-uniform. For this reason, a heat-exchanging temperature is unbalanced to lead to an uneven temperature distribution of the adsorbent, and the regeneration of the adsorbent becomes insufficient or the adsorbent is partially overheated, thereby making it impossible to make effective use of heating energy.

The present invention has been made in view of the above-described circumstances, and an objective of this invention is to provide a regeneration tower and a dry exhaust-gas treating apparatus, capable of reducing an amount of dust in a desorbed gas discharge passage in the state where a flow velocity distribution of the adsorbent on the same cross section is made uniform in the regeneration tower.

Means for Solving the Problems

The present invention employs the following means to solve the problems.

A regeneration tower according to the present invention desorbs adsorbed substances from an adsorbent to which harmful substances in an exhaust-gas are adsorbed. The regeneration tower includes: a regeneration tower main body that has a long trunk and is configured so that a heating unit heating an adsorbent, a separation part separating desorbable substances as a desorbed gas from the heated adsorbent, and a cooling unit cooling the adsorbent from which the desorbable substances have been desorbed by heating are communicatively disposed in one direction and the heating unit and the cooling unit have approximately the same sectional outer diameter; and desorbed gas discharge passages through which the desorbed gas is discharged. The separation part includes an inner barrel part and a flow velocity reduction part that reduces the flow velocity of the desorbed gas, and the desorbed gas discharge passages are connected to a downstream side of the flow velocity reduction part.

According to the present invention, since the separation part has the flow velocity reduction part, it is possible to reduce the flow velocity of the desorbed gas when the desorbed gas passes through the flow velocity reduction part, and cause dust contained in the desorbed gas to be left and separated in the separation part.

Further, the regeneration tower according to the present invention is configured so that the inner barrel part has approximately the same sectional outer diameter as the heating unit and the cooling unit, at least a part of the flow velocity reduction part has a sectional outer diameter that is gradually enlarged toward a downstream side of the desorbed gas so as to surround an outer circumference of the inner barrel part, and an opening causing the inner barrel part and the flow velocity reduction part to communicate with each other is disposed on an upstream side of the flow velocity reduction part.

According to the present invention, the desorbed gas, which is introduced into the flow velocity reduction part via the opening, can be induced to the downstream side thereof along a diameter-enlarged lateral surface of the flow velocity reduction part, and it is possible to gradually and more suitably reduce the flow velocity of the desorbed gas. Further, since the sectional outer diameter of the inner barrel part is approximately equal to sectional radii of the heating unit and the cooling unit, the flow velocity distribution of the adsorbent on the same cross section can be made uniform, and it is possible to make effective use of heating energy required for heat exchange.

Further, the regeneration tower according to the present invention is configured so that the flow velocity reduction part includes a plurality of compartments that are partitioned in parallel toward the downstream side, the neighboring compartments communicate with each other on the downstream side, and the plurality of desorbed gas discharge passages are connected to downstream sides of some of the compartments.

According to the present invention, since the desorbed gas flows into the plurality of compartments, is agitated between the plurality of compartments while flowing, and then is discharged from the plurality of desorbed gas discharge passages, the flow velocity of the desorbed gas can be made uniform, and the flow velocity distribution of the desorbed gas cannot be deviated depending on a location of the separation part. It is possible to efficiently reduce the amount of dust contained in the desorbed gas.

In addition, the regeneration tower according to the present invention is configured so that the flow velocity reduction part is enlarged in diameter related to the inner barrel part so that the desorbed gas flowing through the flow velocity reduction part has a flow velocity of 100 mm/sec or less.

According to the present invention, since the flow velocity of the gas passing through the flow velocity reduction part is 100 mm/sec or less, the dust contained in the gas can be more suitably separated and reduced until the desorbed gas is discharged from the desorbed gas discharge passage.

A dry exhaust-gas treating apparatus according to the present invention includes an adsorption tower configured to adsorb harmful substances in a exhaust-gas to an adsorbent, and a regeneration tower according to the present invention.

Effects of the Invention

According to the present invention, it is possible to reduce the amount of dust in a desorbed gas discharge passage in the state where the flow velocity distribution of an adsorbent on the same cross section is made uniform.

DESCRIPTION OF REFERENCE NUMERALS

1: dry exhaust-gas treating apparatus
2: adsorption tower
3: regeneration tower
11: regeneration tower main body
15: desorbed gas discharge passage
25: separation chamber (separation part)
25A: opening
26: heating chamber (heating unit)
27: cooling chamber (cooling unit)
30: inner barrel part
31: flow velocity reduction part
32: compartment
33: partition plate
34: communication hole Best Mode for Carrying out the Invention One embodiment according to the present invention will be described with reference to FIGS. 1 to 4.

Figure 1:
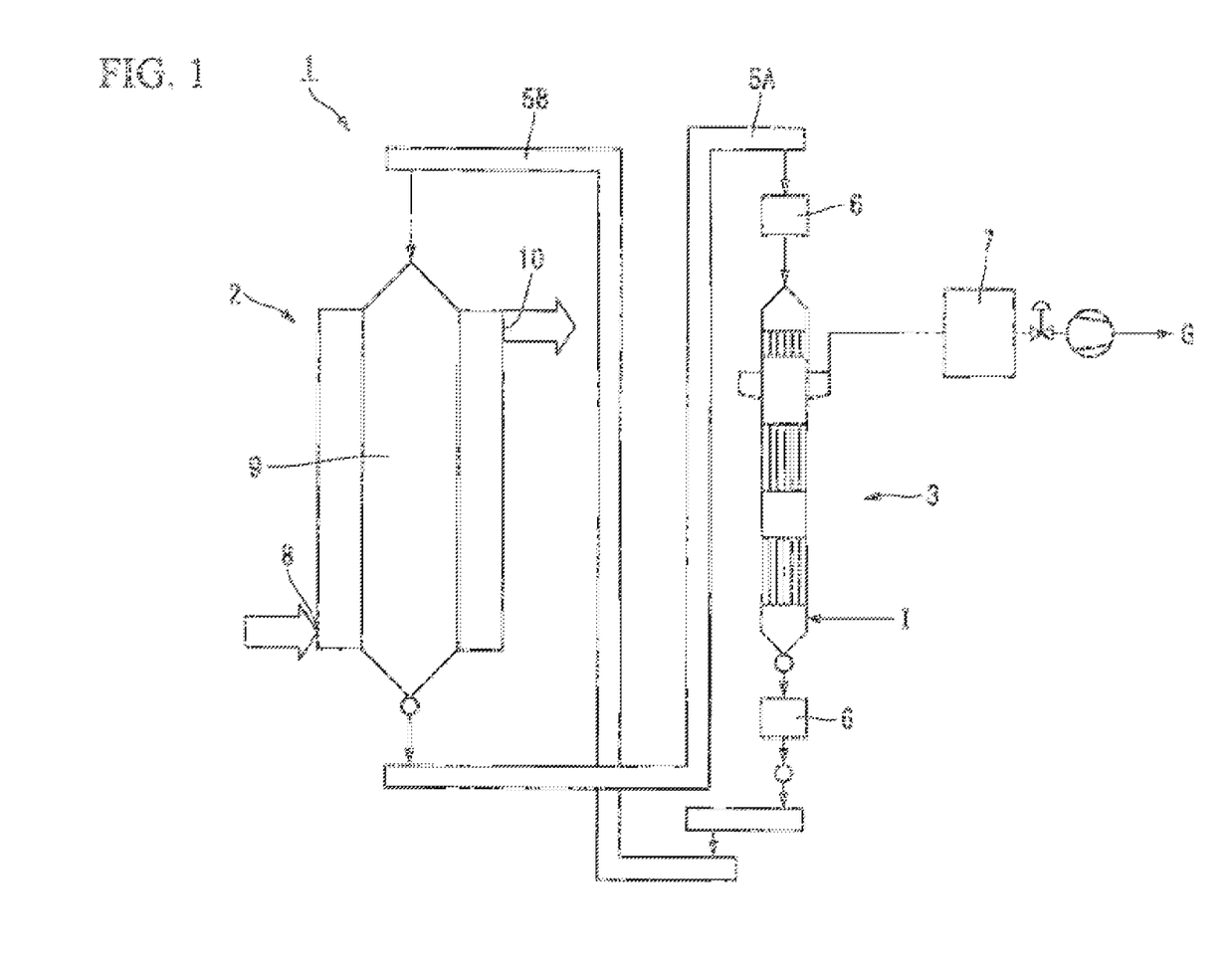
FIG. 1 is a functional block diagram showing a dry exhaust-gas treating apparatus according to one embodiment of the present invention.

As shown in FIG. 1, a dry exhaust-gas treating apparatus 1 according to the present embodiment includes an adsorption tower 2, a regeneration tower 3, first and second transfer paths 5A and 5B that connect the adsorption tower 2 and the regeneration tower 3 to transfer an adsorbent, lock hoppers 6 that are connected to both upper and lower end sides of the regeneration tower 3, and a cleaning tower 7 that cleans a desorbed gas G including desorbable substances released from the adsorbent.

The adsorption tower 2 is a tower that adsorbs and removes various substances in gas such as SOx (sulfur oxide) using an adsorbent. The adsorbent includes, for instance, a carbonaceous adsorbent, an alumina adsorbent, a silica adsorbent, and so forth.

A exhaust-gas introduction port 8 into which a exhaust-gas is introduced, an adsorption tower main body 9 that brings the exhaust-gas into contact with the adsorbent, and a exhaust-gas discharge port 10 through which the exhaust-gas, from which various substances are removed by adsorption, flows out of the adsorption tower main body 9 are disposed at the adsorption tower 2.

Figure 2:
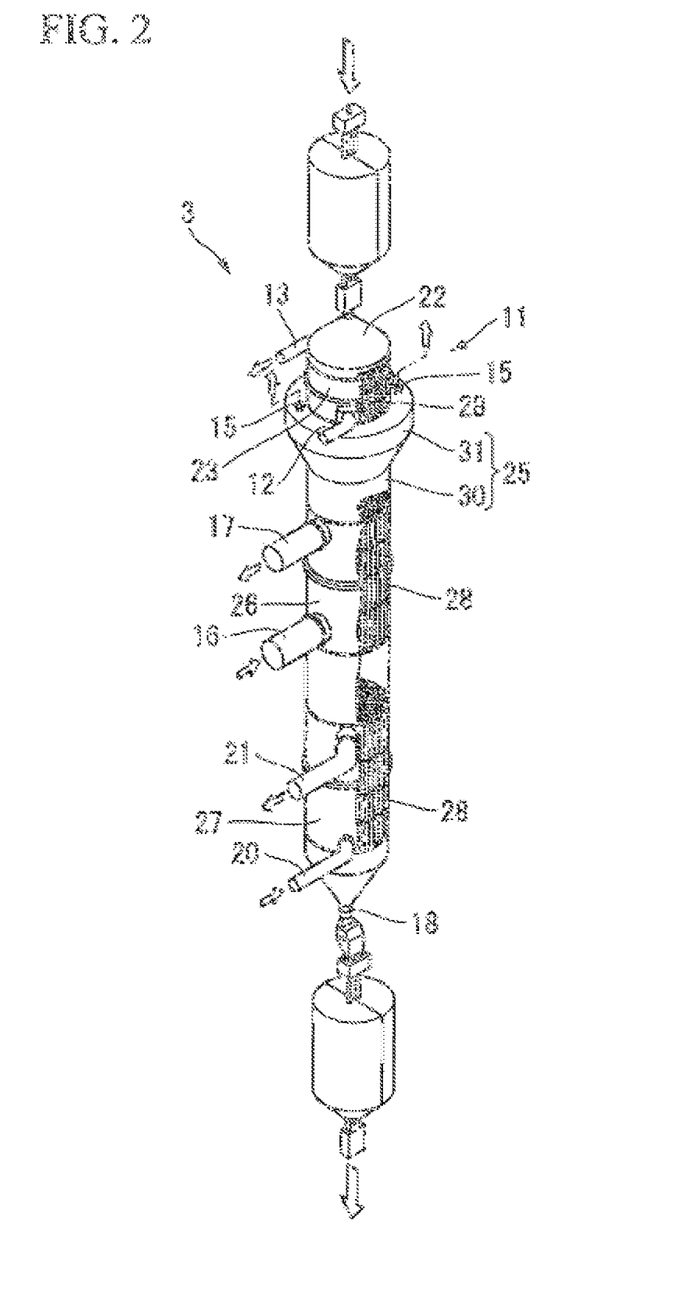
FIG. 2 is a perspective view showing a regeneration tower of the dry exhaust-gas treating apparatus according to one embodiment of the present invention.
Figure 3A:
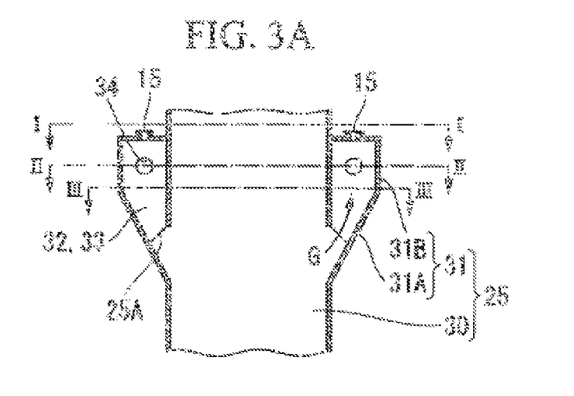
FIG. 3 is longitudinal and transverse sectional views showing a separation chamber of the dry exhaust-gas treating apparatus according to one embodiment of the present invention.
Figure 3B:
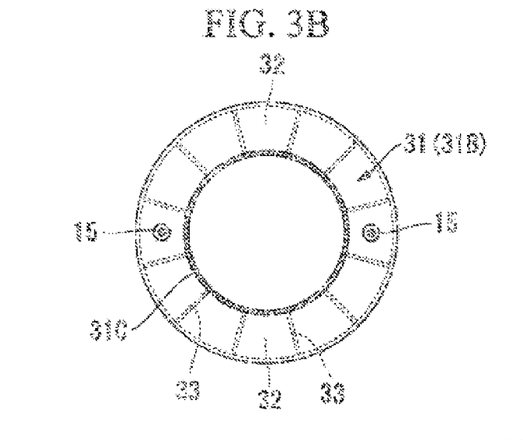
Figure 3C:
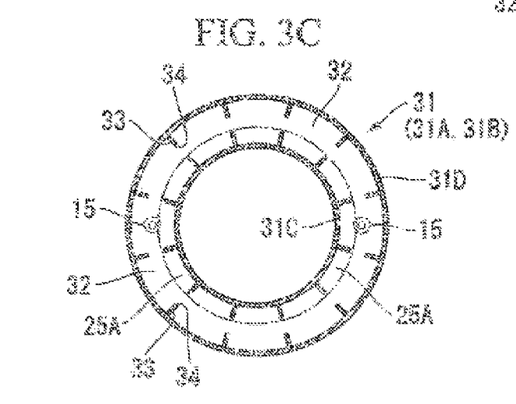
Figure 3D:
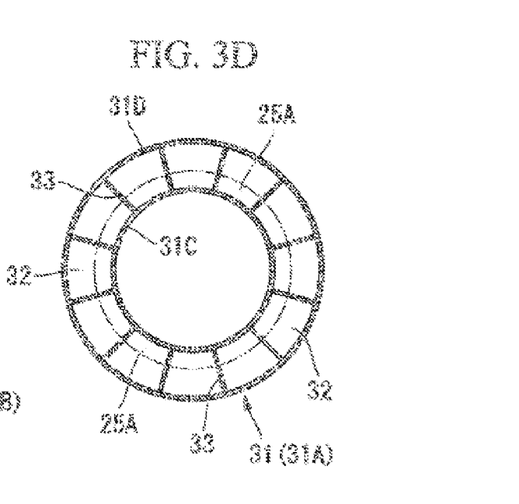

As shown in FIG. 2, the regeneration tower 3 is provided with a regeneration tower main body 11 having a tube shape; and a preheated gas introduction path 12, a preheated gas discharge passage 13, desorbed gas discharge passages 15, a heated gas introduction path 16, a heated gas discharge passage 17, an inert gas introduction path 18, a cooling medium introduction path 20, and a cooling medium discharge passage 21 which are connected to the regeneration tower main body 11.

As in the related art, the regeneration tower main body 11 is provided with a storage chamber 22, a preheating chamber 23, a separation chamber (or a separation part) 25, a heating chamber (or a heating unit) 26, and a cooling chamber (or a cooling unit) 27. An inert gas I is introduced into the regeneration tower main body 11 so as to flow from a lower portion side of the cooling chamber 27 into the regeneration tower main body 11 in an upward direction.

The adsorbent, which has been used to treat the exhaust-gas in the adsorption tower 2 and adsorbed various substances, is stored in the storage chamber 22 for a while. The preheated gas introduction path 12 that introduces a preheated gas into the preheating chamber 23 and the preheated gas discharge passage 13 that discharges the preheated gas after preheating from the preheating chamber 23 are connected to the preheating chamber 23.

Further, as shown in FIG. 2, a plurality of heat transfer pipes 28, which extend in a vertical direction and in which the adsorbent flows, are disposed in the preheating chamber 23. The preheated gas flows outside these heat transfer pipes 28, so that heat is exchanged between both sides and the adsorbent is gradually heated to a temperature of about 180° C. (in the case of the carbonaceous adsorbent). The heat exchange also takes place in the heating chamber 26 and the cooling chamber 27, both of which will be described below, under similar configuration.

The separation chamber 25 is provided with an inner barrel part 30 and a flow velocity reduction part 31 that reduces a flow velocity of a desorbed gas G. The inner barrel part 30 has approximately the same sectional outer diameter as the preheating chamber 23, the heating chamber 26, and the cooling chamber 27. The flow velocity reduction part 31 further includes a sectional inner diameter enlargement part 31A whose diameter is gradually enlarged toward a downstream side of the desorbed gas G so as to surround an outer circumference of the inner barrel part 30, and an outer barrel part 31B having a constant sectional inner diameter.

An opening 25A, which spatially connects the inner barrel part 30 and the flow velocity reduction part 31 to each other, is disposed on an upstream side of the diameter enlargement part 31A.

A plurality of desorbed gas discharge passages 15, which cause desorbable substances separated from the adsorbent to be discharged as the desorbed gas G along with the inert gas I, are connected on a downstream side of the outer barrel part 31B.

As shown in FIG. 3, the flow velocity reduction part 31 is provided with a plurality of compartments 32 that are partitioned in parallel toward a downstream side of the desorbed gas G. The plurality of compartments 32 are formed by a plurality of partition plates 33 disposed in a radial direction so as to partition an annular space, which the flow velocity reduction part 31 has, at approximately equal intervals. That is, the plurality of partition plates 33 are disposed on and fixed to inner and outer circumferential walls 31C and 31D of the flow velocity reduction part 31 so as to intersect perpendicular to each of the inner and outer circumferential walls 31C and 31D.

The plurality of compartments 32 are formed so as to have approximately the same volume as one another. Further, communication holes 34 are formed on a downstream side of the partition plates 33 forming the plurality of compartments 32. Thereby, the neighboring compartments 32 communicate with each other, and the desorbed gas G is allowed to circulate through the communication holes 34.

Furthermore, the desorbed gas discharge passages 15 are installed on a downstream side (top surface) of two of the plurality of compartments 32 which face each other.

Thus, the desorbed gas G is divided from the opening 25A into the plurality of compartments 32, and flows into the flow velocity reduction part 31. Then, the desorbed gas G flows while being agitated between the plurality of compartments 32 via the communication holes 34 of the partition plates 33.

The desorbed gas G is discharged from the plurality of desorbed gas discharge passages 15 in the state where a flow velocity distribution thereof becomes almost uniform.

The diameter enlargement part 31A of the flow velocity reduction part 31 is enlarged in diameter relative to the inner barrel part 30. The diameter enlargement part 31A is enlarged in diameter so that the desorbed gas G flowing through the flow velocity reduction part 31 has a flow velocity of 100 mm/sec or less, and more preferably 50 mm/sec or less.

Here, an amount of the desorbed gas G is determined by an amount of the inert gas I, an amount of introduction gas from the lock hopper 6, and an amount of regenerated gas generated when the desorbable substances are desorbed and decomposed.

Figure 4:
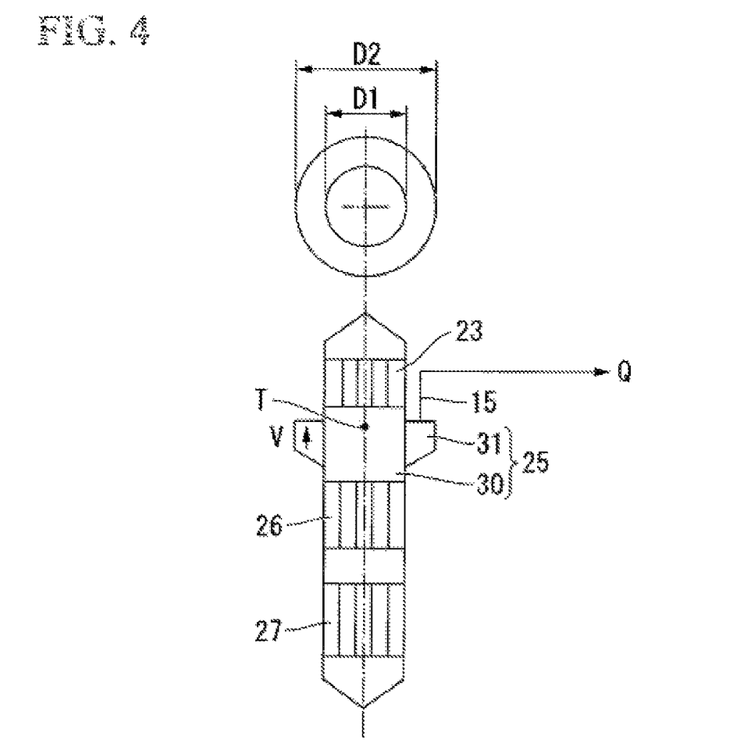
FIG. 4 is a view used when explaining a method of calculating a relationship of sectional diameters of an inner barrel part and a flow velocity reduction part of a separation chamber of a regeneration tower according to one embodiment of the present invention.

For example, as shown in FIG. 4, when the amount of the desorbed gas G determined from the aforementioned gas amounts is given by Q [Nm3/h], the inner diameter of the inner barrel part 30 by D1 [mm], the inner diameter of the outer barrel part 31B of the flow velocity reduction part 31 by D2 [mm], the temperature of the desorbed gas G by T [° C.], and the flow velocity of the gas by V [mm/s], $$D2 = (D1^2 + Q*(273.15+T)/273.15/3600/V4/\pi*10^9)^{0.5}$$

(where * indicates multiplication, / indicates division, ^ indicates an exponent, and π stands for the ratio of the circumference of a circle to its diameter.)

For example, here, when D1=3000 [mm], Q=1000 [Nm³/h], and T=200[° C.], D2=4610 [mm] (when V=50 [mm/s]), and D2=3889 [mm] (when V=100 [mm/s]).

Figure 5:
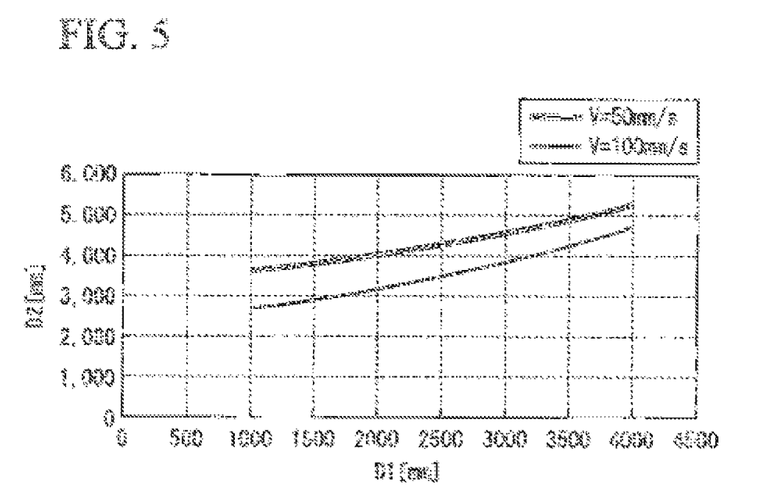
FIG. 5 is a graph showing the relationship of the sectional diameters of the inner barrel part and the flow velocity reduction part of the separation chamber of the regeneration tower according to one embodiment of the present invention.

Since the amount Q and temperature T of the desorbed gas are typically constant, D1 and D2 have a relationship indicated by a graph shown in FIG. 5.

The heated gas introduction path 16 that introduces a heated gas into the heating chamber 26 and the heated gas discharge passage 17 that discharges the heated gas after heating from the heating chamber 26 are connected to the heating chamber 26. In the heating chamber 26, the adsorbent to which various substances are adsorbed is heated to a high temperature of 400° C. or more, preferably about 450° C., via the heated gas (in the case of the carbonaceous adsorbent), and the adsorbed substances are released.

The cooling medium introduction path 20 that introduces a cooling medium into the cooling chamber 27 and the cooling medium discharge passage 21 through which the cooling medium after cooling is discharged are connected to the cooling chamber 27.

Air, water, and so forth are used as the cooling medium. The adsorbent from which the desorbable substances are released is cooled by heat exchange with the cooling medium in the cooling chamber 27.

The first transfer path 5A transfers the adsorbent from the adsorption tower 2 to the regeneration tower 3, while the second transfer path 5B transfers the adsorbent from the regeneration tower 3 to the adsorption tower 2.

The lock hoppers 6 whose configuration is known are connected to opposite end sides of the regeneration tower 3, respectively in order to secure gas-tightness between the first transfer path 5A and the regeneration tower 3 and between the second transfer path 5B and the regeneration tower 3.

The cleaning tower 7 is connected to the desorbed gas discharge passages 15, and cleans the desorbed gas G so as to produce a by-product.

Next, descriptions will be made of operations of the dry exhaust-gas treating apparatus 1 and the regeneration tower 3 according to the present embodiment.

The exhaust-gas introduced from the exhaust-gas introduction port 8 into the adsorption tower 2 is subjected to removal of various harmful substances in the adsorption tower main body 9. The various harmful substances in the exhaust-gas such as sulfur oxide are adsorbed to the adsorbent, and are removed from the exhaust-gas.

The exhaust-gas is discharged from the exhaust-gas discharge port 10 into the air via a chimney (not shown) directly or after another gas treatment is performed.

Meanwhile, the adsorbent, which has adsorbed the adsorption substances, is transferred to the regeneration tower 3 via the first transfer path 5A.

The transferred adsorbent is introduced into the storage chamber 22, and then transferred to the preheating chamber 23. The adsorbent is heat-exchanged with the preheated gas introduced from the preheated gas introduction path 12 into the preheating chamber 23, and the adsorbent, which has adsorbed the adsorption substances, is preheated to a temperature of about 180° C. (in the case of the carbonaceous adsorbent). The preheated gas after preheating is discharged from the preheating chamber 23 via the preheated gas discharge passage 13.

The adsorbent, which has been transferred from the preheating chamber 23 to the heating chamber 26, is heat-exchanged with the heated gas introduced from the heated gas introduction path 16 into the heating chamber 26, and is heated to a temperature of 400° C. or more (in the case of the carbonaceous adsorbent). Thereby, the adsorption substances are released from the adsorbent.

The heated gas after heating is discharged from the heating chamber 26 via the heated gas discharge passage 17.

Meanwhile, the desorbed gas G is introduced into the inner barrel part 30 of the separation chamber 25, and then flows into the flow velocity reduction part 31 via the opening 25A. While the desorbed gas G flows from the diameter enlargement part 31A to the outer barrel part 31B, the flow velocity of the desorbed gas G is reduced to 100 mm/sec or less, more preferably 50 mm/sec or less. In this case, the dust in the desorbed gas G stays in the separation chamber 25, and is separated from the desorbed gas G.

Thus, the desorbed gas G contains the desorbable substances desorbed from the adsorbent, and the dust is reduced. Then, the desorbed gas G is discharged from the separation chamber 25 via the plurality of desorbed gas discharge passages 15, and is sent to the cleaning tower 7.

Thereafter, the adsorbent moves to the cooling chamber 27. The adsorbent is cooled by heat exchange with the cooling medium introduced from the cooling medium introduction path 20. The cooling medium after cooling is discharged from the cooling chamber 27 via the cooling medium discharge passage 21.

According to the dry exhaust-gas treating apparatus 1 and the regeneration tower 3, since the separation chamber 25 has the flow velocity reduction part 31, it is possible to reduce the flow velocity of the desorbed gas G when the desorbed gas G passes through the flow velocity reduction part 31. Accordingly, it is possible to cause the dust contained in the desorbed gas G to remain in the separation chamber 25, and to separate the dust from the desorbed gas G.

Further, the gas, which is introduced into the flow velocity reduction part 31 from the inner barrel part 30 via the opening 25A, is induced toward the outer barrel part 31B on a downstream side thereof along a lateral surface of the diameter enlargement part 31A of the flow velocity reduction part 31. Thereby, it is possible to gradually reduce the flow velocity of the desorbed gas G.

Further, since the sectional outer diameter of the inner barrel part 30 is approximately equal to sectional radii of the heating chamber 26 and the cooling chamber 27, the flow velocity distribution of the adsorbent on the same cross section can be made uniform. Thereby, it is possible to make effective use of heating energy required for the heat exchange.

Further, since the flow velocity reduction part 31 includes the plurality of compartments 32 partitioned in parallel toward a downstream side, the neighboring compartments 32 communicate with each other on the downstream side, and the plurality of desorbed gas discharge passages 15 are connected to downstream sides of some of the compartments 32, the desorbed gas G flows while being agitated between the plurality of compartments 32, and then is discharged. Accordingly, the flow velocity of the desorbed gas G is made uniform, and the flow velocity distribution of the desorbed gas G is not deviated depending on a location of the separation part. Thereby, it is possible to efficiently reduce the amount of dust in the desorbed gas discharge passage 15.

In this case, since the flow velocity of the gas passing through the flow velocity reduction part 31 is 100 mm/sec or less, the dust contained in the gas can be more suitably reduced until the desorbed gas G is discharged from the desorbed gas discharge passage 15.

Further, the technical scope of the invention is not limited to the aforementioned embodiment. Various modifications can be made without departing from the scope of the invention.

For example, the dry exhaust-gas treating apparatus 1 and the regeneration tower 3 according to the present embodiment are configured so that the separation chamber 25 is disposed between the preheating chamber 23 and the heating chamber 26. However, without limitation to this configuration, the separation chamber 25 may be disposed between the heating chamber 26 and the cooling chamber 27.

Industrial Applicability

A regeneration tower and dry exhaust-gas treating apparatus according to the present invention can reduce the amount of dust in a desorbed gas discharge passage in the state where a flow velocity distribution of an adsorbent on the same cross section in the regeneration tower is made uniform.

The invention claimed is:

1. A regeneration tower, which desorbs adsorbed substances from an adsorbent to which harmful substances in an exhaust-gas are adsorbed, the regeneration tower comprising:
    a regeneration tower main body having a long trunk and configured so that a heating unit heating the adsorbent, a separation part separating desorbable substances as a desorbed gas from the heated adsorbent, and a cooling unit cooling the adsorbent from which the desorbable substances have been desorbed by heating are communicatively disposed in one direction and the heating unit and the cooling unit have approximately the same sectional outer diameter; and
    desorbed gas discharge passages through which the desorbed gas is discharged,
    wherein the separation part includes an inner barrel part and a flow velocity reduction part that reduces a flow velocity of the desorbed gas, and the desorbed gas discharge passages are connected to a downstream side of the flow velocity reduction part.

2. The regeneration tower according to claim 1, wherein:
the inner barrel part has approximately the same sectional outer diameter as the heating unit and the cooling unit;
at least a part of the flow velocity reduction part has a sectional outer diameter that is gradually enlarged toward a downstream side of the desorbed gas so as to surround an outer circumference of the inner barrel part; and
an opening causing the inner barrel part and the flow velocity reduction part to communicate with each other is disposed on an upstream side of the flow velocity reduction part.

3. The regeneration tower according to claim 1, wherein:
the flow velocity reduction part includes a plurality of compartments that are partitioned in parallel toward the downstream side, and the neighboring compartments communicate with each other on the downstream side; and
the plurality of desorbed gas discharge passages are connected to downstream sides of some of the compartments.

4. The regeneration tower according to claim 1, wherein the flow velocity reduction part is enlarged in diameter relative to the inner barrel part so that the desorbed gas flowing through the flow velocity reduction part has a flow velocity of 100 mm/sec or less.

5. A dry exhaust-gas treating apparatus comprising:
an adsorption tower configured to adsorb harmful substances in a exhaust-gas to an adsorbent;
a regeneration tower main body having a long trunk and configured so that a heating unit heating the adsorbent, a separation part separating desorbable substances as a desorbed gas from the heated adsorbent, and a cooling unit cooling the adsorbent from which the desorbable substances have been desorbed by heating are communicatively disposed in one direction and the heating unit and the cooling unit have approximately the same sectional outer diameter; and
desorbed gas discharge passages through which the desorbed gas is discharged,
wherein the separation part includes an inner barrel part and a flow velocity reduction part that reduces a flow velocity of the desorbed gas, and
the desorbed gas discharge passages are connected to a downstream side of the flow velocity reduction part.

* * * * *